United States Patent Office 3,252,602
Patented May 24, 1966

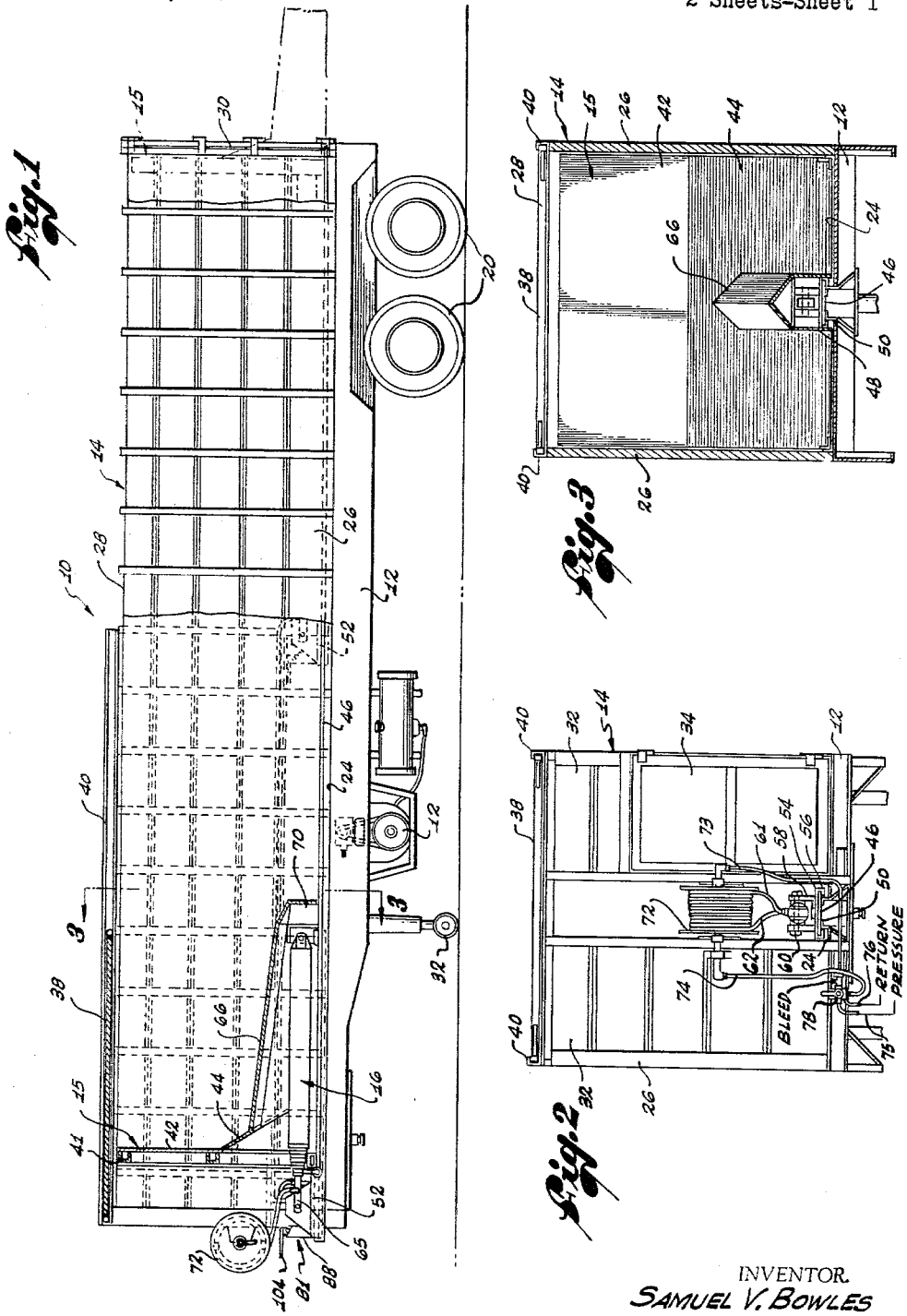

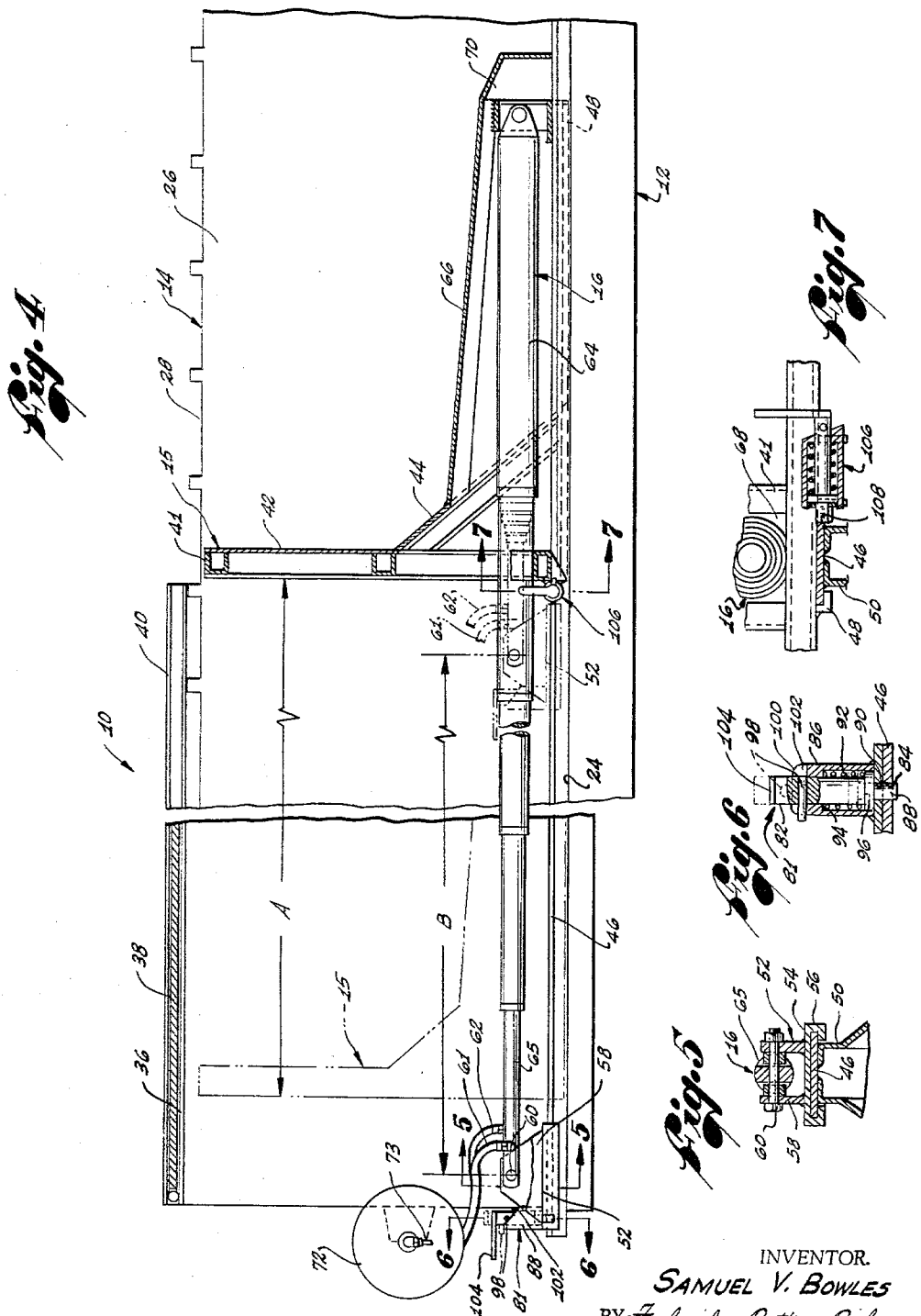

3,252,602
REFUSE HANDLING AND TRANSPORTING APPARATUS
Samuel V. Bowles, 12039 Branford St., Sun Valley, Calif.
Filed Mar. 5, 1964, Ser. No. 349,622
3 Claims. (Cl. 214—82)

This invention relates generally to refuse handling and transporting apparatus, and more particularly to an improved vehicle for long distance hauling of refuse, embodying a mechanism for aiding in obtaining efficient loading and for unloading the body.

The problems of collection and disposal of refuse have become more and more acute with the constant increase in population and concentration of people in and around large metropolitan areas. For obvious reasons, ultimate dump sites are now being located at considerable distances from the places of pick-up in such areas.

Moreover, vehicles used for refuse collection usually are not well suited for long distance hauling. Such vehicles are necessarily relatively small and designed to operate at slow speeds, so they can maneuvered safely in crowed areas. Most modern day collection vehicles also embody loading and packing mechanisms which, although they are highly desirable, are large in size and, therefore, limit useful storage space. Still further, collection vehicles of certain designs have open top receptacle bodies from which trash is likely to spill or blow during high speed travel.

Still further, an efficient collection vehicle normally operates with a crew of two or more men. Thus, travel to and from the dump sites is inefficient as part of the crew is idle.

Accordingly, it will readily be appreciated that from the standpoints of efficient utilization of equipment and manpower, it is unfeasible to use a collection vehicle for long distance hauling of refuse to an ultimate dump site.

The solution to this problem has been to provide transfer stations at convenient locations within the metropolitan area. Refuse is brought to these stations which occupy relatively little space in collection vehicles. It is there transferred to large high speed vehicles especially designed for efficient long distance hauling of the refuse to the dump site. Only one man is then occupied in transporting refuse to the dump site. One such station, which is adapted for sanitary and economical handling of refuse, is disclosed in my U.S. Patent No. 3,059,789, entitled, Refuse Collection Apparatus, and issued October 23, 1962.

It will be further understood that a vehicle used for such long distance hauling is desirably capable of being loaded so as to make maximum use of the available storage space. Moreover, for optimum efficiency, such a vehicle includes means for fast unloading. In these important respects, vehicles heretofore available have been somewhat less than satisfactory. Specifically, the mechanisms for enhancing loading and for unloading have been relatively time consuming to operate and prone to breakdowns. Accordingly, it is a primary object of this invention to provide an improved long distance hauling vehicle which overcomes these deficiencies and possesses many desirable operational features.

Another object is to provide a vehicle of the type described in which the mechanism for enhancing loading and for unloading is hydraulically powered and adapted to be quickly and easily operated.

Still another object is to provide a vehicle of the type described further characterized in that it is economical of manpower.

A further object is to provide a vehicle of this type which is strong and durable and capable of efficient operation, yet which is economical to manufacture and maintain.

These and other objects, features, and advantages of the invention will be better understood by referring to the following detailed description taken in conjunction with the accompanying drawings in which:

FIGURE 1 is a side view elevational view of the vehicle of the invention with a portion of its side wall broken away and removed in order to show underlying parts more clearly;

FIGURE 2 is a front elevational view taken from the left-hand side of FIGURE 1;

FIGURE 3 is a vertical section taken along line 3—3 of FIGURE 1;

FIGURE 4 is a longitudinal, vertical section on an enlarged scale of the forward portion of the vehicle body, with certain parts being shown in elevation for added clarity;

FIGURE 5 is a fragmentary section taken along line 5—5 of FIGURE 4;

FIGURE 6 is a fragmentary section taken along line 6—6 of FIGURE 4; and

FIGURE 7 is a fragmentary section view taken along line 7—7 of FIGURE 4.

Referring to the drawings and in particular to FIGURE 1 thereof, numeral 10 designates the improved vehicle of the invention. In general, it comprises a semi-trailer chassis 12 mounting an enclosed rectangular body 14. A pusher blade assembly 15 is positioned transversely in the body and arranged for longitudinal movement. Movement of the blade assembly 15 is accomplished with a hydraulic cylinder-piston assembly 16. The latter assembly, in turn, is supplied with pressurized fluid by a hydraulic pump 18 driven by a suitable engine both of which are supported on the underside of the chassis 12.

It will be seen that the vehicle body 14 is similar in external configuration to a conventional enclosed semi-trailer body and is adapted to be attached for towing to a semi-tractor. Its chassis 12 is supported adjacent its rearward end on two sets of dual wheels 20 and at its forward end, when detached from the tractor, on small support wheels 22.

Preferably, the body 14 is enclosed in order to enable refuse to be loaded to maximum capacity and yet not to spill out. To this end, it comprises a flat bed 24 affixed to the chassis 12, sidewalls 26, and a top wall 28. At its rearward end, the body 14, as is conventional, is provided with a hingedly mounted door 30 that permits the entire rearward end to be opened for loading and unloading purposes. In some applications it may be desirable to provide a small auxiliary door within the main door so as to enhance compaction of refuse during loading. Such an auxiliary rear door is illustrated in my above-mentioned U.S. Patent No. 3,059,789.

The forward end of the body 14, illustrated in FIGURE 2, is partially closed by a pair of panels 32 that extend from the bed 24 to the top wall 28. While the blade assembly 15 prevents refuse from spilling out the forward end of the body, the closure panels 32 are desirable to protect the moving parts of the mechanism and also from a safety standpoint. To afford access to the forward side of the blade assembly 15, a hingedly mounted door 34 is provided in the right-hand panel 32.

In some instances, it may be desirable to load the body 14 from overhead. To permit such loading, an opening 36 is provided in the top wall 28 adjacent the forward end of the body. The opening 36 is normally closed by a cover 38 slidably mounted in U-shape tracks 40, as illustrated in FIGURES 1 and 2. Preparatory to overhead loading, the cover 38 is simply slid rearwardly within the limits of the tracks 14.

With a vehicle of the present type, all refuse is maintained in the body 14 rearwardly of the blade assembly 15. Thus, the blade assembly 15 occupies virtually the entire cross-section except for working clearances. Referring in particular to FIGURES 1 and 3, the assembly 15 may be seen to include a generally rectangular frame 41 which is oriented vertically or perpendicular to the bed 24. The rearward or working surface of the assembly 15 has a vertical upper section 42 and a rearwardly sloping lower section 44 that terminates immediately adjacent the bed. The sloping lower section 44 serves as a scoop to prevent refuse from bunching up and tending to block movement of the blade assembly.

Preferably, the blade assembly 15 is arranged for longitudinal movement between a retracted position adjacent the forward end of the body 14 and an extended position adjacent the rearward end thereof, illustrated in full in phantom lines respectively in FIGURE 1. Mounting for such longitudinal movement is accomplished with a centrally located track 46 extending the full length of the body and a pair of cooperating slides 48 (FIGURE 7) on the blade assembly 15. As illustrated in FIGURES 1 and 3, the track 46 is supported a short distance above the bed 24 by a pair of L-shaped channels 50 secured to the chassis 12. The channels 50 are spaced inwardly of the edges of the track 46 so as to cause its marginal edges to overhang.

As illustrated in FIGURE 7, the slides 48 comprise L-shaped members secured to the frame and positioned to slidably engage the edges of the track 46 and its underside adjacent those edges. Thus, the blade assembly 15 is supported for sliding movement on top of the track 46 with the slides 48 serving to guide it and maintain the desired transverse orientation.

It has heretofore been thought that hydaulic cylinder-piston assemblies could not be used successfully to operate pusher blade assemblies in vehicle bodies of the present type. This stemmed from the fact that the length of a semi-trailer body of the present type is substantial and, hence, the stroke of such a hydraulic assembly would have to be extremely long, assuming it were constructed to operate properly. The cost of an assembly with a stroke of this length would be prohibitive and even when constructed with multiple cylinders and sleeves, the size would be so great as to occupy a significant part of the otherwise useful storage space.

The present invention obviates this problem by attaching the forward end of a cylinder-piston assembly to a traveling anchor 52, and then successively moving the blade assembly and anchor down the length of the body 14 in what might be considered a staging operation. To elaborate, the anchor 52 is initially fixed in position and the blade assembly 15 is free for movement. In the first step, the cylinder-piston assembly 16 is extended to move the blade assembly 15 rearwardly to a staging position, illustrated in FIGURE 4, which corresponds to the length of the stroke of the assembly 16. This is indicated in FIGURE 4 as the distance "A," and may, by way of example, be substantially equal to half the length of the body.

The blade assembly 15 is next locked in position and the anchor 52 is released. The operator then actuates the cylinder-piston assembly 16 to retract, so as to draw the anchor up to a rearward position shown in phantom lines in FIGURE 4. This is indicated as the distance "B" in FIGURE 4 and, in order to make maximum use of the stroke of the cylinder-piston assembly 16, is equal to the distance "A." In the final step, in the procedure for extending the blade assembly, the anchor 52 is locked in its forward position and the blade assembly is released, whereby subsequent actuation of the cylinder-piston assembly 16 causes the blade assembly 15 to move rearwardly to its extended position adjacent the rearward end of the body, illustrated in phantom lines in FIGURE 1.

To return the blade to its retracted position of FIGURE 1, the reverse operation is followed. Briefly, with the anchor 52 locked in its phantom line position of FIGURE 4, the assembly 16 is retracted to move the blade assembly 15 back to and locked in its staging position, illustrated in full lines in FIGURE 4. The anchor 52 is then released and moved back to its forward position and locked therein. Finally, the blade assembly 15 is released so that it may be retracted to its original position.

It will be understood that the distance "A" in FIGURE 4 between the retracted and staging position of the blade assembly 15, described above as being substantially equal to half the length of the body, might desirably be some lesser distance, as, for example, one-third of the length of the body. In such case, the blade assembly 15 would then have two staging positions and the number of steps involved in moving the assembly between its retracted and extended positions would be correspondingly increased.

In order to be movable in the manner set forth above, the traveling anchor 52 is slidably mounted on the track 46. Referring to FIGURES 4 and 5, it comprises a flat plate 54 that slidably engages the upper surface of the track 46. The plate 54, in turn, is maintained in the assembly with the track by a pair of L-shaped flanges 56 which engage the edges of the track and its undersides adjacent the edges in much the same manner as the slides 48 for mounting the blade assembly. Projecting upwardly from the plate 54 are a pair of horizontally spaced supports 58. One end of the cylinder-piston assembly 16 is received between the supports 58 and secured thereto by suitable means, as, for example, by the nut and bolt assembly 60.

It is desirable for space considerations that the overall length of the cylinder-piston assembly 16 in a retracted condition be relatively small. Accordingly, it here comprises several associated pairs of sleeves and pistons telescopically received within one another. Assemblies of this type are currently available on the market, and the construction thereof forms no part of the present invention; therefore, it is not described in further detail. Suffice it to say, the assembly is double acting, that is, hydraulic fluid is alternately supplied through one and relieved through the other of the lines 62 and 63 to extend and retract it. An outermost cylinder 64 and a piston rod 65 are adapted for attachment to blade assembly 15 and anchor 52.

As previously noted, it is desirable in order to maximize storage capacity that the blade assembly 15 be capable of being retracted to a position adjacent the forward end of the body 14. This is made possible in the present case by providing the assembly 15 with a forwardly projecting hood, illustrated in FIGURES 1 and 3. The assembly 16 extends through a hole 68 in the frame 41 for connection to the traveling anchor 52. The hood 66 is relatively small in cross-section, and has a nose 70 that tapers to a sharp leading edge so that the hood does not appreciably interfere with the operation of the blade assembly 15. In actuality, the hood 66 serves to enhance the stability of the blade assembly 15 by virtue of the slides 48 for mounting the assembly 15 extending the full length between the frame 41 and the nose 70.

In illustrative embodiment, the piston rod 65 is connected to the anchor 52 with the nut and bolt assembly 60 in the manner previously described. The cylinder, on the other hand, is secured to the nose 70 of the hood forming a part of the blade assembly in the manner illustrated in FIGURES 1 and 3. This mounting arrangement is preferred by reason of reducing the necessary lengths of the hydraulic lines 61 and 62. However, it will, of course, be understood that the mounting arrangement could be reversed without any operational effects.

During movement of the anchor 52 between its forward and rearward positions, it is necessary to pay out and retract the lines 61 and 62. This is achieved in the present case with a spring actuator reel 72, supported for rotation between the panels 32 at the forward end of the body 14. During movement of the anchor 52, the lines 61 and 62 are automatically paid off and retracted onto the reel 72 by virtue of its spring tension.

From the reel 72, hydraulic lines 73 and 74 connected to lines 61 and 62, respectively, extend to a control valve 78 which in turn is connected to the pump 18, by pressure and return lines 75 and 76, respectively. Preferably, the control valve 78 is mounted on the chassis fairly near the center of the body at the forward end thereof in order that an operator may actuate the valve and observe movement of the blade assembly 15 through the space between the panels 32. The valve 78 is actuatable in a direction to supply pressurized fluid through the lines 75, 73 and 61 and bleed fluid through the lines 62, 74 and 76 to extend the cylinder-piston assembly 16, and in the opposite direction to supply fluid through the lines 75, 74 and 62 and bleed fluid through the lines 61, 73 and 76 to retract the assembly.

Under some conditions of loading, it is advantageous, in order to improve the compaction of the load, to have the blade assembly 15 retract at a controlled rate. To achieve this, an adjustable bleed valve 80 is installed in hydraulic line 73. This valve, when suitably adjusted, serves to restrict the flow of fluid and thereby afford resistance to retraction of the cylinder-piston assembly 16.

Means 81 for locking the anchor 52 in its operating position are provided on the anchor 52 and the track 46. Such means, illustrated in FIGURES 4 and 6, comprises a spring actuated locking pin 82 mounted on the anchor 52 and engageable in a cooperating bore 84 in the track 46. For mounting the lock pin 82, a sleeve 86 is attached to the upper surface of the plate 54 adjacent its forward end. The pin 82 is vertically movable in the sleeve 86 and has a reduced lower portion 88 which projects through a bore 90 in the plate. The pin 82 is yieldably urged downwardly by a compression spring 92 that bears against an internal shoulder 94 in the sleeve 86 and a circumferential shoulder 96 on the pin.

In order to maintain the locking means in its released position to free the anchor for movement until the pin is out of alignment with the bore 86, a cross-pin 98 is provided on the upper end of the pin and adapted to engage on an upper flat section 100 on the sleeve 86. When the cross-pin 98 is so engaged, the locking pin 82 is held up away from the track 46, as illustrated in phantom lines in FIGURES 4 and 6. Mating with the flat surface 100 on the upper end of the sleeve is a sloping cam surface 102. Once the pin is rotated off of the flat surface 100 and released, the compression spring 92 serves to move it downwardly with the cross-pin 98 engaging the cam surface 102 causing the pin 82 to rotate. Conversely, in order to move the pin 82 to its released position, it is simply necessary to rotate it, whereupon engagement of the cross-pin 98 with the cam surface 102 urges the pin upwardly. Alternately, the pin 82 can simply be lifted upwardly and then rotated to position the cross-pin 98 on the flat surface 100. For convenience, rotation may be effected with a handle 104 secured to and projecting outwardly from the pin 82.

In actual use, once the pin 82 is disaligned with the bore 84 in the track 46, the pin 82 is normally rotated to move the cross pin 98 out of engagement with the flat surface 100 and onto the cam surface 102. This, in effect, conditions the locking means for automatic locking. Thus, when the pin is aligned with a bore (not shown), identical to the bore 84 and located at the rearward position of the anchor, illustrated in phantom lines in FIGURE 4, the pin 82 automatically engages. During travel of the anchor 52, the lower end of the pin 82 simply slides along in engagement with the upper surface of the track 46.

As may be seen in FIGURE 7, locking means 106 virtually identical to those just described are provided on the blade assembly for locking it in its staging position. Because of this virtual identity, the locking means 106 is not described in detail. In this latter instance, however, the locking means 106 is oriented horizontally and carried by one of the slides 48 for mounting the blade assembly. The pin 82 in this case engages in a notch 108 in the track at a location corresponding to the staging position of blade assembly 15. When the locking means 106 is conditioned for automatic locking, the terminal end of the pin 82 rides in sliding engagement with the edge of the track 46 until it is aligned with the notch 108.

With the above structure in mind, a sequence of operation will now be traced through. It is assumed that the blade assembly 15 is initially in its retracted position of FIGURE 1 and that the body 14 is loaded with refuse. In this condition, the locking means 81 on the traveling anchor 52 will be engaged to hold it into position while the locking means 106 and the blade assembly preferably is released but conditioned for automatically locking responsive to the assembly reaching its staging position. At the dump, the rear door 30 on the body is opened and the control valve 78 is actuated to extend the cylinder-piston assembly 16 and thereby move the blade assembly 15 to its staging position. Responsive to it reaching this position, illustrated in FIGURE 4, the locking means 106 engages to lock the blade assembly 15 in that position. During this movement, a portion of the refuse in the body 14 is, of course, forced out through the rear opening.

To commence the next step of the operation, the operator releases the locking means 81 holding the anchor 52 in position and actuates the control valve 78 to retract the cylinder-piston assembly 16 and causes the anchor 52 to move toward its forward position. After the anchor 52 has moved a short distance sufficient to disalign the locking pin 82 with its bore 84, the locking means 81 may be conditioned for automatic locking upon the anchor reaching its forward position. Assuming this has been done, the anchor 52 is automatically locked when it reaches its forward position.

It is then necessary for the operator to enter the body and release the locking means 106 holding the blade assembly 15 in its staging position. At this juncture, it is observed that in some applications, the frictional resistance of the larger blade assembly 15 to movement may be sufficient to hold it in position when the anchor 52 is moved. If this should be the case, there is no necessity of operating the locking means 106. Once locking of the blade assembly by whatever method has been accomplished, the control valve 78 is again actuated to extend the cylinder-piston assembly position, illustrated in phantom lines in FIGURE 1. This, of course, completes emptying of the vehicle body 14.

To return the blade assembly to its retracted position, the reverse procedure is followed. As suggested above, it is desirable in order to enhance compaction of refuse during loading that the blade assembly slowly retract in the body. This is achieved by suitable adjustment of the valve 80. Should this loading method be employed, then refuse is compacted against the blade assembly 15. Alternately, the blade body may be loaded from overhead through the opening 36 in the top. With this loading arrangement, the blade assembly is advantageously reciprocated between its forward and staging positions to compact the charges of refuse against the rear door 30 of the body.

The present blade assembly 15 may be actuated with the hydraulic power means to quickly and easily unload the body. Further, it may be advantageously operated to enhance the compaction of refuse loaded therein. The mechanism for achieving these desirable results is very simple in construction and trouble-free in operation, and from these standpoints constitutes a substantial improvement over other vehicles of this type heretofore available.

While a specific embodiment of my invention has been illustrated and described in detail, it will be understood that this was only by way of illustration and that various changes in the construction and arrangement of cooperating parts may be made without departing from the spirit and scope of the invention.

I claim:
1. Refuse handling and transporting apparatus, comprising:
   a receptacle body having forward and rearward ends and a loading opening at its rearward end;
   door means on said body for closing said opening;
   a pusher blade assembly arranged transversely in said body and movable longitudinally therein between a retracted position adjacent its forward end and an extended position adjacent its rearward end;
   a travelling anchor mounted in said body forwardly of said blade assembly and movable longitudinally therein, said anchor being unattached with respect to the forward wall of the body;
   locking means on said anchor and body for releasably locking said anchor in a forward position adjacent the forward end of the body and a rearward position intermediate the forward and rearward ends of said body;
   track means in the body for mounting said blade assembly and anchor for movement as aforesaid, the frictional engagement between said blade assembly and track means being greater than that between said anchor and track means, so that when said locking means is released and relative movement is effected between said blade assembly and anchor by a force acting simultaneous thereon said blade assembly remains substantially stationary relative to said body and said anchor moves;
   and power operated means connected to said blade assembly and anchor for exerting a force acting simultaneously thereon and effecting longitudinal movement of said blade assembly and anchor toward and away from one another, the maximum stroke of said power operated means being at least equal to the longitudinal distance between the forward and rearward positions of said anchor, but less than the longitudinal distance between the retracted and extended positions of said blade assembly.

2. Refuse handling and transporting apparatus, comprising:
   an elongated and enclosed receptacle body having forward and rearward ends and an opening at its rearward end, said body having a substantially uniform cross-section from end to end;
   door means on said body for closing said opening;
   a track mounted centrally in said body along the floor thereof and extending longitudinally substantially from end to end;
   a generally vertical pusher blade assembly arranged transversely in said body for longitudinal movement between a retracted position in close proximity to the forward end of said body and an extended position adjacent the rearward end of said body, said blade assembly occupying substantially the entire cross-section of said body;
   means on said blade assembly for slidably mounting said blade assembly on said track for such longitudinal movement;
   a travelling anchor mounted in said body forwardly of said blade assembly and supported on said track for longitudinal movement therein;
   locking means on said anchor and engageable with said track for releasably locking said anchor in a forward position adjacent the forward end of the body and a rearward position intermediate the forward and rearward ends of the body;
   a hydraulic cylinder-piston assembly disposed adjacent and substantially parallel to said track and including a cylinder connected to one of said blade assembly and anchor and a piston rod connected to the other of said blade assembly and anchor, said blade assembly being extensible and retractable for effecting relative longitudinal movement of said blade assembly and anchor and having a maximum stroke at least equal to the distance between the forward and rearward positions of said anchor but less than the distance between the retracted and extended positions of said blade assembly;
   means forming a hole in said blade assembly adjacent the lower end thereof and adjacent said track through which freely passes a major portion of said cylinder-piston assembly;
   a hood of small cross-section in relation to that of said blade assembly projecting rearwardly therefrom and arranged in protective, covering relationship with the portion of said cylinder-piston assembly passing through the hole in said blade assembly;
   and control means connected to said cylinder-piston assembly and accessible extensively of said body, said control means being actuatable when said locking means is engaged for moving said blade assembly along said track, and when said locking means is released for moving said anchor along said track.

3. The subject matter of claim 2, wherein the means for slidably mounting said blade assembly extends along substantially the entire length of said hood on the underside thereof in engagement with said track.

References Cited by the Examiner

UNITED STATES PATENTS

| 2,712,388 | 7/1955 | Skromme et al. | 214—82 |
| 2,934,226 | 4/1960 | Dempster et al. | 214—82 |

OTHER REFERENCES

German printed application 1,149,301, May 1963.

GERALD M. FORLENZA, *Primary Examiner.*

HUGO O. SCHULZ, *Examiner.*